United States Patent
Pettersson (10) Patent No.: US 12,124,283 B2
(45) Date of Patent: Oct. 22, 2024

(54) METHOD AND CONTROLLER FOR DYNAMICALLY DETERMINING A SYSTEM CURVE IN A HEAT POWER SYSTEM

(71) Applicant: CLIMEON AB, Kista (SE)

(72) Inventor: Rikard Pettersson, Solna (SE)

(73) Assignee: CLIMEON AB, Kista (SE)

( * ) Notice: Subject to any disclaimer, the term of this patent is extended or adjusted under 35 U.S.C. 154(b) by 415 days.

(21) Appl. No.: 17/624,244

(22) PCT Filed: Jul. 2, 2020

(86) PCT No.: PCT/EP2020/068656
§ 371 (c)(1),
(2) Date: Dec. 30, 2021

(87) PCT Pub. No.: WO2021/004882
PCT Pub. Date: Jan. 14, 2021

(65) Prior Publication Data
US 2022/0350350 A1      Nov. 3, 2022

(30) Foreign Application Priority Data
Jul. 5, 2019    (SE) .................... 1950856-3

(51) Int. Cl.
G05D 7/06        (2006.01)
F01K 13/02       (2006.01)
G05B 15/02       (2006.01)

(52) U.S. Cl.
CPC .......... *G05D 7/0635* (2013.01); *G05B 15/02* (2013.01); *F01K 13/02* (2013.01)

(58) Field of Classification Search
None
See application file for complete search history.

(56) References Cited

U.S. PATENT DOCUMENTS

| | | | |
|---|---|---|---|
| 2008/0067116 A1* | 3/2008 | Anderson | G01F 1/80 702/45 |
| 2008/0082304 A1* | 4/2008 | Miller | G05B 23/021 700/275 |
| 2012/0173027 A1* | 7/2012 | Cheng | F04D 15/0066 700/282 |

(Continued)

FOREIGN PATENT DOCUMENTS

EP    2336537 A1    6/2011

OTHER PUBLICATIONS

PCTSearch Report from PCT/EP2020/068656 dated Sep. 30, 2020, 2 pages.

*Primary Examiner* — David Earl Ogg
(74) *Attorney, Agent, or Firm* — Haynes Beffel & Wolfeld LLP; Andrew L. Dunlap (57) ABSTRACT

A method and controller of dynamically determining a current system curve in a heat power system, in which the heat power system comprises a regulator and sensors. The controller controls an output of the regulator to find the current system curve, collects and checks sensor values with limited accuracy to determine if properties of the sensor values indicate that a point of the current system curve has been reached. When at least two points are found the controller models the current system curve by linear interpolation between the first and second point of the current system curve.

7 Claims, 4 Drawing Sheets

(56) References Cited

U.S. PATENT DOCUMENTS

| | | | |
|---|---|---|---|
| 2012/0323530 A1* | 12/2012 | Mazzaro | G01L 3/26 |
| | | | 702/182 |
| 2014/0328673 A1 | 11/2014 | Tamaoki | |
| 2017/0287142 A1* | 10/2017 | Xie | A63F 13/35 |
| 2021/0148589 A1* | 5/2021 | Reider | F24F 11/65 |

* cited by examiner

METHOD AND CONTROLLER FOR DYNAMICALLY DETERMINING A SYSTEM CURVE IN A HEAT POWER SYSTEM

PRIORITY APPLICATIONS

This application is a national stage entry, filed under 35 U.S.C. § 371, of International Application No. PCT/EP2020/068656, filed Jul. 2, 2020, which claims priority to SE 1950856-3, filed Jul. 2, 2019; the entire contents of each are incorporated by reference herein in its entireties.

TECHNICAL FIELD

The present invention relates generally to a method and controller for dynamically determining a system curve in a heat power system. The present invention also relates to a computer program and a computer program product for performing the method.

BACKGROUND OF INVENTION

In power plants that are run by thermodynamic power cycles, such as a Rankine cycle, a Kalina cycle, a Carbon Carrier cycle and/or a Carnot cycle, a turbine is an essential element for generating power. A liquid is heated until it is converted into dry gas which enters the turbine to perform work. Typically, the liquid is heated in a heat exchanger to produce dry gas, which exits the heat exchanger from an outlet port and is fed to the turbine.

The Rankine cycle is an idealized thermodynamic cycle of a heat engine that converts heat into mechanical work. An Organic Rankine cycle (ORC) is a Rankine cycle using other working fluids than water/steam, in particular organic fluids. Moreover, in the present invention, the term "ORC" is meant as any power generation process capable of converting 50-150° C. heat streams to electricity. The applicant uses the process termed "Heat Power" as described in WO 2012/128715 and SE 2013/051 059, PCT SE 1300 576-4, SE 1400 027-7 and SE 1400 160-6, and WO 2015/112 075 and PCT SE 2015/050 368, and SE 1400 514-4, and related documents in the patent families, all hereby incorporated by reference.

One problem with power generation of 50-150° C. heat streams to electricity is the efficiency of the process. With low temperature differences it is important that the process is controlled such that the current system curve of the heat power system is followed as close as possible thereby minimizing any losses. One way to solve this problem is to is to retrofit the heat power system with more accurate sensors in order to be able to follow the system curve closer. However, this is an expensive solution and will negatively affect the economy of the heat power system. Another obvious solution would be to use the system curves that often are provided from manufactures of system parts, such as pumps, where the manufacture may provide different system curves for different operation conditions for such pumps. Such a solutions is disclosed in for example US2008/0067116. The problem with this solution is that it uses system curves that are static and probably differ from the current system curve which will affect the efficiency negatively. Usually, this is not a very big problem, but in context of ORC when using low temperature differences this reduction in efficiency will have a negative effect. Furthermore, manufactures usually do not provide system curves for a whole heat power system but only for individual parts, such as pumps, of the system.

Consequently, in view of the above, there is a need for a controller and method for dynamically determining a current system curve in a heat power system such that the efficiency of the heat power system can be improved.

SUMMARY OF INVENTION

An object of the present invention is to provide an efficient method for dynamically determining a current system curve in a heat power system.

According to an aspect of the present invention this object is accomplished by a method of dynamically determining a current system curve in a heat power system, in which the heat power system comprises a regulator and sensors, said method being performed by a controller and comprises the steps of controlling an output of the regulator to find the current system curve, collecting current sensor values with limited accuracy from the sensors, checking the properties of the collected sensor values, determining that the properties of the sensor values indicate that a point of the current system curve has been reached, saving the determined point as a first point, repeating the collecting, the checking and the determining steps until at least a second point of the current system curve has been indicated and modelling the current system curve by linear interpolation between the first and second point of the current system curve.

In an exemplary embodiment the method further comprises limiting the output of the regulator to the modelled current system curve.

In another exemplary embodiment the modelling of the current system curve is repeated each time an additional point of the current system curve has been indicated. The modelled current system curve may also be adapted to the additional point by interpolating the current system curve against the points closest to the additional point.

In yet another exemplary embodiment the properties for indicating a point on the current system curve may relate to fluttering sensor values.

According to another aspect of the present invention this object is accomplished by a controller for dynamically determining a current system curve in a heat power system, in which the heat power system comprises a regulator and sensors, the controller comprising a processor and a non-transitory computer-readable medium, configured to store instructions, which when executed by the processor cause the controller to control an output of the regulator to find the current system curve, collect current sensor values with limited accuracy from the sensors, check the properties of the collected sensor values, determine that the properties of the sensor values indicate that a point of the current system curve has been reached, save the determined point as a first point, repeat the collect, the check and the determine steps until at least a second point of the current system curve has been indicated, and model the current system curve by linear interpolation between the first and second point of the current system curve.

In an exemplary embodiment the controller is further caused to limit the output of the regulator to the modelled current system curve.

In another exemplary embodiment the controller is further caused to repeat the modelling of the current system curve each time an additional point of the current system curve has been indicated. The controller may be further caused to adapt the modelled current system curve to the additional point by interpolating the current system curve against the points closest to the additional point.

In yet another exemplary embodiment the controller is further caused to indicate a point on the current system curve based on properties of fluttering sensor values.

According to a further aspect the present invention this is accomplished by a computer program comprising computer program code, the computer program code being adapted, if executed on a processor, to implement the method as described above.

According to yet a further aspect this accomplished by a computer program product comprising a computer readable storage medium, the computer readable storage medium having the computer program described above.

One advantage with the method of the present invention is that it is possible to control a heat power system to follow an actual system curve very close increasing the efficiency of the heat power system and without the need of retrofitting the heat power system with more accurate and thus expensive sensors.

DESCRIPTION

The present invention generally relates to controlling an output of a regulator in order to determine and model a current system curve in a heat power system. In context of the present application a heat power system comprises at least one heat power unit, which in turn comprises heat exchangers, a turbine etc and is described further in FIG. 3. Said heat power system is preferably a part of a larger heat power plant also comprising means for delivering heat from a heat source and cold from a cold source, such as for example external pumps, pipes etc. In a heat power system forming a part of a heat power plant there may be several types of regulators for regulating flows, temperatures, pressures etc. Thus, the heat power system or the heat power plant may comprise different parts comprising regulators all having their own system curves. Thus, in context of the present application determining and modeling a current system curve may apply to any part of the heat power system, as is or as a part of a heat power plant. As a background a general heat power system as a part of a heat power plant will be described in conjunction with FIG. 1.

Figure 1:
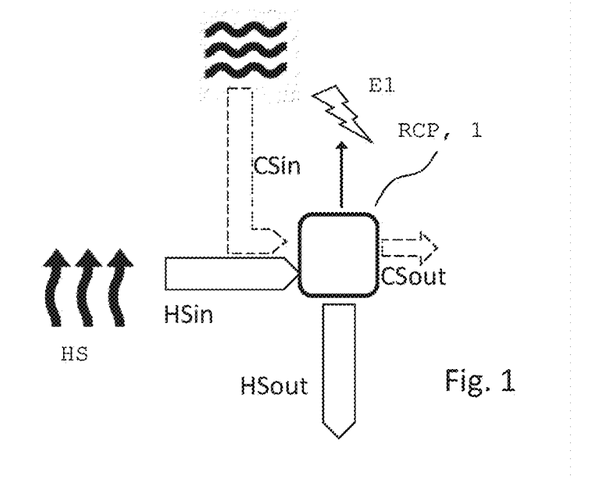
FIG. 1 shows a schematic view of a general heat power system.

FIG. 1 shows a heat power system 1 as a part of a heat power plant arranged to continuously generate a first power output E1 in the form of electricity utilizing the temperature difference of a heat and a cold source. The heat power system 1 is operating in accordance with a thermodynamic closed loop cycle process being arranged to receive a heat input HSin and a cold input CSin. The heat input may be from a geothermal well or any other heat source HS, for example waste heat from industrial processes or gensets, and the cold input CSin from a cold source CS, for example a cooling tower, radiator, a large water body (from a nearby river, lake or sea) or underground well. The heat input HSin and the cold input CSin are used for phase change of a working medium. The heat power plant may also include the means for creating the hot and cold source, for example a geothermal well, a genset creating waste heat, a cooling tower or similar, and means for delivering the heat source and cold source to the heat power system, for example external pumps, pipes, filters and valves.

Essentially, the heat power system is a particularly efficient power generation system operating at low pressures and capable of utilizing heat of low temperatures, e.g. 70-120° C., for power generation. Other ORC processes may be used as well in the embodiments of the present invention.

Figure 2:
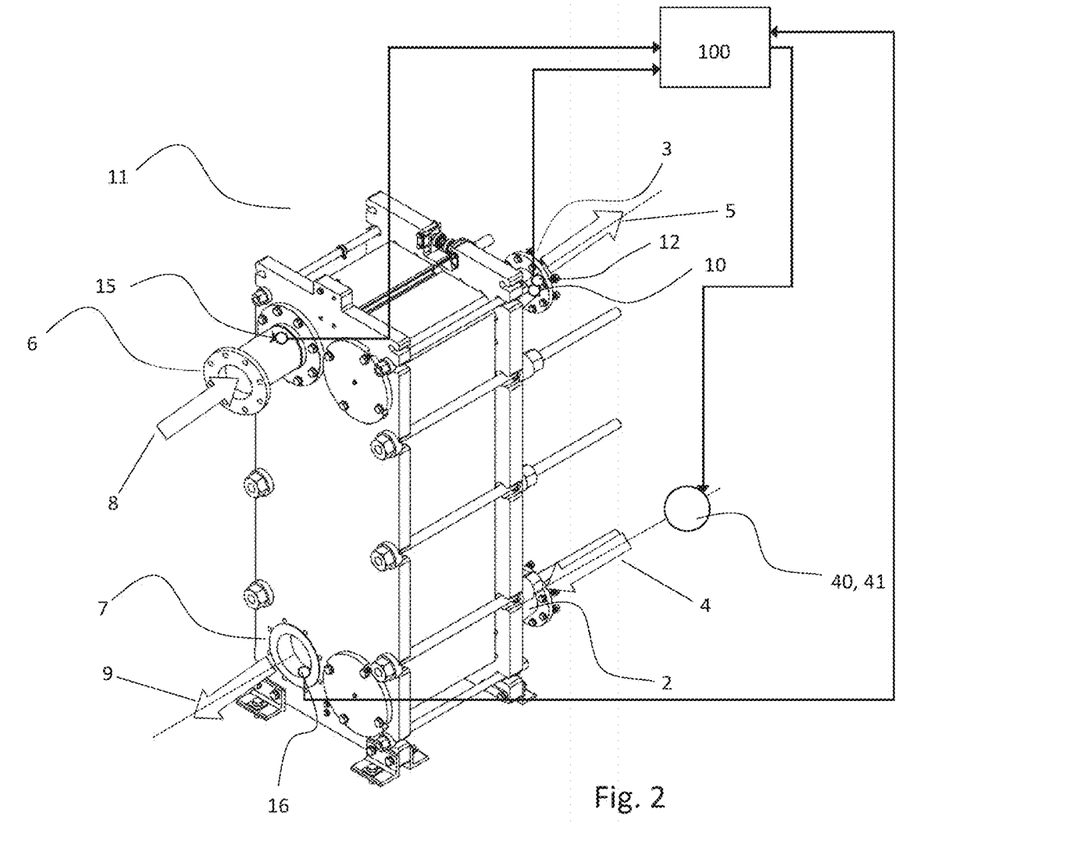
FIG. 2 shows part of a heat power system with a heat exchanger, a controller and a regulator device for controlling the flow in a first medium.

Turning now to FIG. 2, which shows an exemplary embodiment in form of a heat exchanger system being a part of the heat power system described above. The heat exchanger system comprises a heat exchanger 11, a controller 100 and a regulator 40, 41 for controlling a flow in a first medium. In the heat exchanger 11 a second medium transfers heat to the first medium. The heat exchanger 11 comprises an inlet port 2 and an outlet port 3 for the first medium, as well as an inlet port 6 and an outlet port 7 for the second medium. In FIG. 2 arrows 4 and 5 indicate the flow direction of the first medium entering and exiting the heat exchanger 11, while arrows 8 and 9 indicate the flow direction of the second medium entering and exiting the heat exchanger 1. The first medium is in context of the present disclosure referred to as the medium to be heated while the second medium is referred to as the medium which transfers heat to the first medium. The first medium may also be referred as the working medium, i.e. the medium that is subject to phase change.

The first medium and the second medium may be selected from the following groups water, alcohols (such as methanol, ethanol, isopropanol and/or butanol), ketones (such as acetone and/or methyl ethyl ketone), amines, paraffins (such as pentane and hexane) and/or ammonia. In an exemplary embodiment the first medium and the second medium are selected differently, such that the boiling point of the first medium is lower than the boiling point of the second medium.

The heat exchanger 11 further comprises a first temperature sensor unit 10, a second temperature sensor unit 15, a third temperature sensor unit 16 and a pressure sensor unit 12. The first temperature unit 10 is arranged to measure the temperature and the pressure sensor unit 12 is arranged to measure the pressure of the first medium exiting the heat exchanger 11 at the outlet port 3. The second temperature sensor unit 15 is arranged to measure the temperature of the second medium when entering the heat exchanger 11 at the inlet port 6. The third temperature sensor unit 16 is arranged to measure the temperature of the second medium when exiting the heat exchanger 11 at the outlet port 7. In an exemplary embodiment the temperature sensor units 10, 15, 16 comprise resistance temperature detectors, such as a platinum resistance thermometer with a nominal resistance of 10-1000 ohms at 0° C. As understood by a person skilled in the art there are a wide variety of temperature sensors that may be used to measure the temperature at the different locations of the heat exchanger 11.

All these measured temperature values and the measured pressure value are used when generating a flow control signal to control the flow, via regulator 40, 41, of the first medium in the heat exchanger 11.

The heat exchanger 11 is arranged and/or adapted to vaporize the first medium and may be configured as a boiler. In order to increase the efficiency of heat exchanger it is important to follow the system curve of the heat exchanger as close as possible. It would be desirable to be able to theoretically determine a system curve to follow, but the environment in and around the heat exchanger 11 is constantly changing and thus this is not really useful. Instead, one uses the input from the different sensors 10, 12, 15, 16 in order to determine a current system curve. If one has very accurate sensors 10, 12, 15, 16 it is also possible to determine an accurate current system curve and to control the system to closely follow the current system curve. In context of the present application accurate sensors means that there are enough sensors positioned at exactly right portions. With other words it might not be the sensor itself that has limited accuracy but, the positioning of the sensor may give a poor sensor reading with limited accuracy. This would give an efficient system. However, the problem is that the current sensor values that are collected by the sensors 10, 12, 15, 16 have limited accuracy and thus the current system curve is difficult to determine. To retrofit for example a heat exchanger 11 with more sensors and at better positions is not really an option, especially when it comes to systems operating at low pressures and capable of utilizing heat of low temperatures, e.g. 70-120° C., for power generation.

Figure 5:
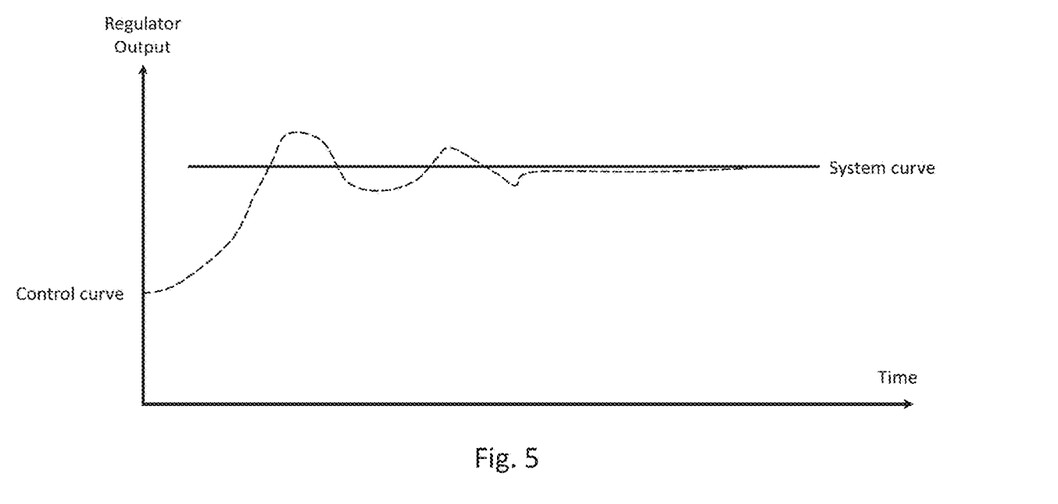
FIG. 5 shows a diagram of a system curve and control curve for regulator output vs. time.

Thus, in context of the present application it is not possible to obtain a point on the current system curve with the sensor readings with limited accuracy. Instead, the inventor surprisingly realized that instead of using the actual measured inaccurate sensor values one could use an indication of different properties of the sensor values in order to determine a point on the current system curve. Such an indication may for example be when the measured sensor values are fluttering, jumping back and forth, are unstable, which indicates that the regulator output in form of the control curve is at a position above the current system curve which is shown in FIG. 5. In other embodiments the indication may be different such as fast changes in sensor values. The main point here is that the sensor readings with limited accuracy behave differently above the system curve compared to below the system curve and as long as the sensor reading is below the system curve it is difficult to tell how close to the system curve you really are. The system saves a first point for indicating the position of the current system curve in a memory, which is to be discussed further below. In response to that the control curve passes the current system curve the regulator output is decreased such that the control curve falls below the current system curve at which point the measured sensor values are stable again. The regulator output is then increased again, but this time the system remembers the first point and the regulator output is controlled such that the control curve barely passes the current system curve. The system also saves this value as a second point for indicating the position of the current system curve in the memory.

With two saved points of the current system curve the current system curve is modelled by linear interpolation between the first and second saved point of the current system curve. This interpolation is shown as curve no. 1 in FIG. 4. The different method steps when determining the current system curve will be closer described below in conjunction with FIG. 7.

Figure 6:
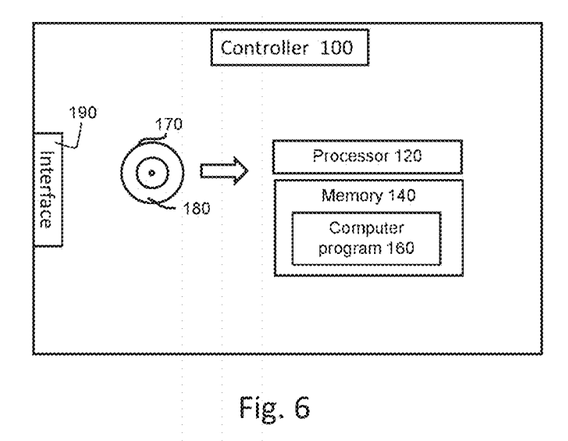
FIG. 6 shows a schematic view of controller for controlling the regulator device in a heat power system.

Turning now to FIG. 6 the controller 100 for dynamically determining the current system curve in a heat power system 1 will be closer described. The controller 100 is configured to and is operable for performing the method to be described in conjunction with FIG. 7. The controller 100 comprises a processor 120 and a memory 140. In context of the present application the term processor 120 should be interpreted broadly as processing circuitry, which may comprise one or more programmable processors, application-specific integrated circuits, field programmable gate arrays or combinations of these (not shown) adapted to execute instructions. The memory 140 contains instructions executable by said processing circuitry, whereby the controller 100 is operative to control an output of the regulator 40; 41 to find the current system curve, collect current sensor values from the sensors 10; 12; 15; 16, check the properties of the collected sensor values, determine that the properties of the sensor values indicate that a point of the current system curve has been reached, save the determined point as a first point A, repeat the collect, the check and the determine steps until at least a second point B; C of the current system curve has been indicated, and model the current system curve by linear interpolation between the first and second point of the current system curve.

According to other embodiments, the controller 100 may further comprise an interface 190, which may be considered to comprise conventional means for communication with other units or devices. The instructions executable by the processor 120 may be arranged as a computer program 160 stored e.g. in the memory 140.

The computer program 160 may comprise computer readable code means, which when run in the controller 100 causes the controller 100 to perform the steps described in method below. The computer program 160 may be carried by a computer program product connectable to the processor 120. The computer program product may be the memory 140. The memory 140 may be realized as for example a RAM (Random-access memory), ROM (Read-Only Memory) or an EEPROM (Electrical Erasable Programmable ROM). Further, the computer program may be carried by a separate computer-readable medium 170, such as a CD, DVD or flash memory, from which the program could be downloaded into the memory 140. Alternatively, the computer program may be stored on a server or any other entity connected or connectable to the controller 100 via the interface 190. The computer program may then be downloaded from the server into the memory 140.

The controller 100 may in an exemplary embodiment further be operative to limit the output of the regulator 40; 41 to the modelled current system curve, i.e. the control curve is not allowed to exceed the system curve. The controller 100 is in a further exemplary embodiment operative to repeat the modelling of the current system curve each time an additional point B; C of the current system curve has been indicated. In such a case the controller may be operative to adapt the modelled current system curve to the additional point B; C by interpolating the current system curve against the points closest to the additional point.

In another exemplary embodiment the controller 100 may be operative to indicate a point A; B; C on the current system curve based on properties of fluttering, unstable or jumping sensor values. It should be understood that also other indications could be used to determine a point on the current system curve.

Figure 7:
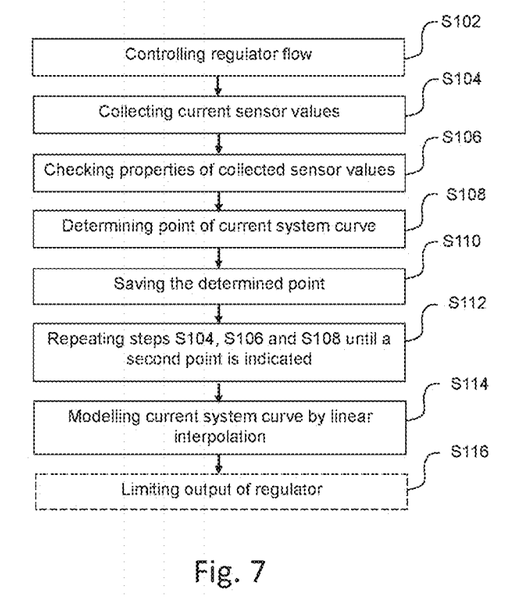
FIG. 7 is a flow chart showing the method for determining the system curve.

Turning now to FIG. 7 the method according to the present invention will be closer described by means of a flow chart. As mentioned above, the method dynamically determines the current system curve in a heat power system 1. The heat power system 1 comprises a regulator 40; 41 and sensors 10; 12; 15; 16 as defined above. The method is performed by a controller 100. In an exemplary embodiment the controller 100 is a Proportional Integral Derivative, PID, regulator, a Programmable Logic Controller, PLC, a personal computer or any other suitable control system.

Figure 4:
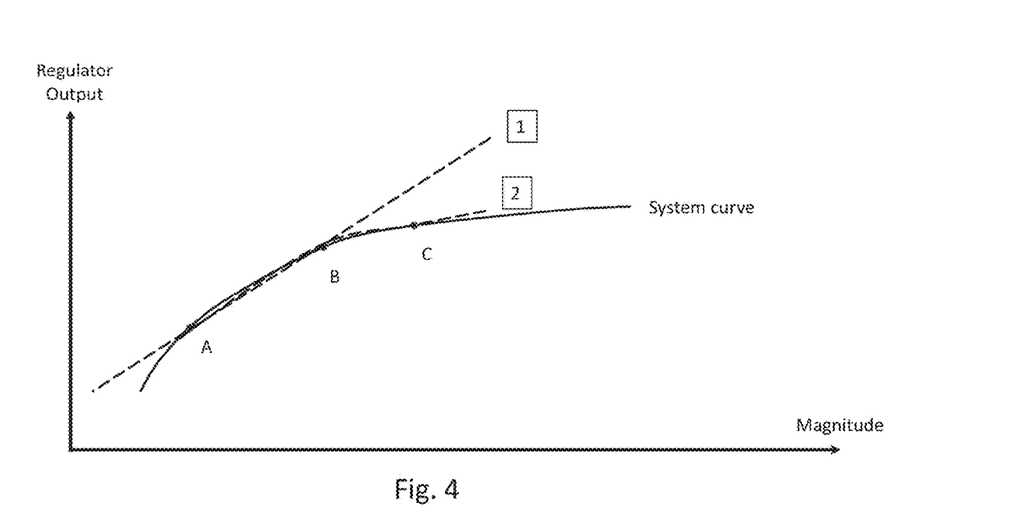
FIG. 4 shows a diagram of a system curve for regulator output vs. magnitude.

In step S102 the controller controls the regulator 40; 41 flow, i.e. the output of the regulator 40; 41 in order to find the to find the current system curve. The regulator 40; 41 output is in FIG. 4 shown as a function of magnitude and in FIG. 5 as a function of time. The output of the regulator affects the control curve shown with dotted lines in FIG. 5. At first the regulator 40; 41 increases the output, which is reflected by an increasing control curve. In step S104 the controller 100 collects current sensor values with limited accuracy from the sensors 10; 12; 15; 16 and checks in step S106 the properties of the collected sensor values. The checking step is made in order to identify if there are any deviations from reliable sensor values, i.e. unexpected values. Such unexpected values may be fluttering, jumping and/or unstable values. It is the insight from the inventor that these unexpected values indicate that a point on or above the system curve has been reached as discussed above.

In step S108 the controller 100 determines that the properties of the sensor values indicate that a point of the current system curve has been reached. In step S110 this determined point is saved in the memory 140 of the control as a first point A. In step S112 the steps of collecting, S104, checking, S106, and determining S108 are repeated until at least a second point B; C of the current system curve has been indicated. With these at least two points A; B; C of the system curve the controller models, in step S114, the current system curve by linear interpolation between the first and second point of the current system curve. It should be understood that there are other options than interpolation for determining the current system curve depending on the number of indicated points on the current system curve. One such technique could be curve fitting. In FIG. 4 curve no. 2 uses more than 2 points, A, B and C to model the current system curve.

In an exemplary embodiment the method further comprises limiting, in step S116, the output of the regulator 40; 41 to the modelled current system curve, i.e. keeping the control curve on or barely below the current system curve, as is indicated in the right-hand half of FIG. 5.

As mentioned above the method may repeat the modelling, in step S114, of the current system curve each time an additional point B; C of the current system curve has been indicated. In such a case the modelled current system curve may in an exemplary embodiment be adapted to the additional point B; C by interpolating the current system curve against the points closest to the additional point.

Figure 3:
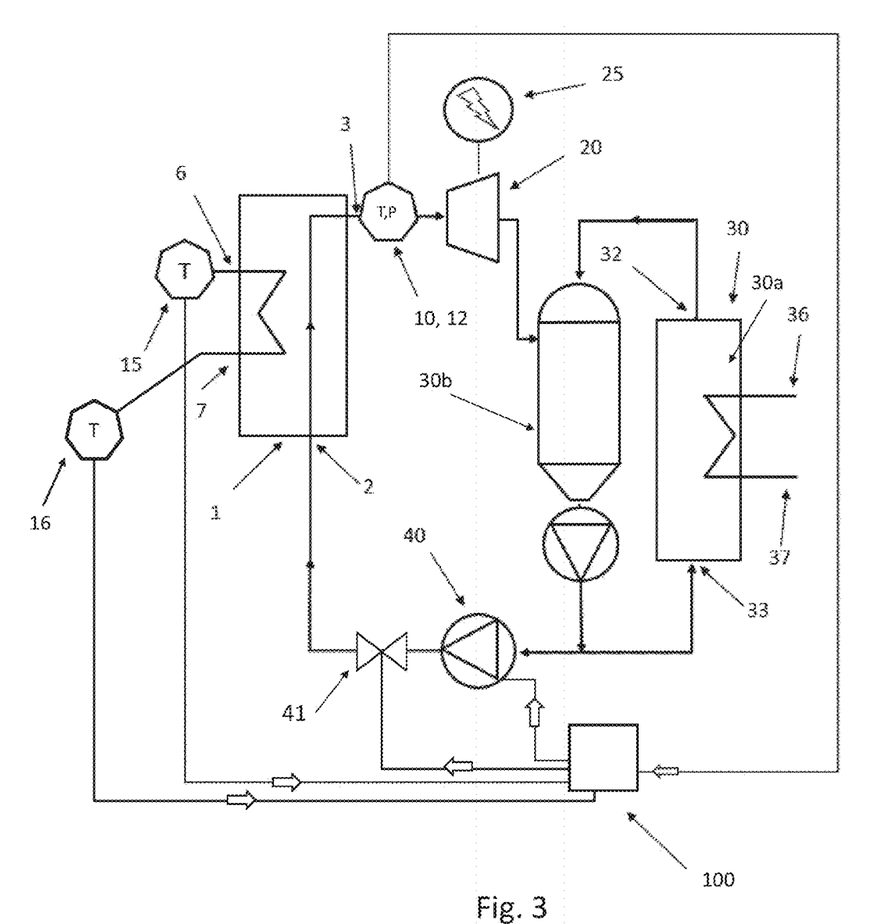
FIG. 3 illustrates a heat power unit in which the present invention may be utilized.

Turning now to FIG. 3 an exemplary embodiment will be described in which the heat exchanger 1 is part of a heat power system comprising one heat power unit. The heat power system is a closed loop thermodynamic system, preferably an Organic Rankine Cycle, ORC, system. The ORC system comprises a circulating working medium, i.e. the first medium, circulating through a turbine 20 coupled to a power-generating device 25 which is configured to generate electric power while expanding the gas which is produced in a first heat exchanger 1 by boiling and overheating the working medium. The boiling and overheating are accomplished by guiding the hot heat transferring second medium through the first heat exchanger 1. The gas which has passed through the turbine 20 and power-generating device 25 is condensed in a condenser 30 by cooling the gas with a cooling medium. In FIG. 3, the condenser 30 comprises a second heat exchanger 30a arranged to cool a stream of working medium and a separate condenser tank 30b to condense the working medium. The second heat exchanger 30a has an inlet 36 and an outlet 37 for the cooling medium as well as an inlet 33 and an outlet 32 for the working medium, i.e. an inlet 32 for the gas entering the condenser 30 and an outlet 33 for the condensate. In another exemplary, not shown, embodiment the condenser 30 is a single heat exchanger unit in which the gaseous working medium is directly condensed by indirect or direct contact with the cooling medium.

The regulator 40, 41 conveys the working medium condensed in the condenser 30 to the first heat exchanger 1. The working medium (i.e. the first medium) enters the first heat exchanger 1 via the inlet port 2 of the first medium and exits through the outlet port 3 of the first medium in form of gas. The second medium enters the first heat exchanger 1 via the inlet port 6 of the second medium and then exits via the outlet port 7 of the second medium.

As mentioned above the regulator 40, 41 is configured for controlling the output thereof in order to find the current system curve, i.e. in this exemplary embodiment the flow of the first medium into the heat exchanger 1 through the first medium inlet port 2. The regulator may comprise a pump 40, a valve 41 and/or an injector or any combination of such devices. Thus, when the controller 100 sends a flow control signal to the regulator 40, 41 for controlling the flow of the first medium the regulator 40, 41 may reduce or increase the area at the inlet port 2 of the first medium, reduce or increase the rotational speed of the pump 40 or the injector, or both alternatives. As mentioned above, the controller collects sensor values, checks the properties thereof in order to determine if the collected sensor values indicate that a point of the current system curve has been reached. Thus, this is just one application of the present invention, which be used to determine any type of system curve dynamically.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein and are intended to be encompassed hereby. Moreover, it is not necessary for the controller or method to address each and every problem sought to be solved by the presently described concept, for it to be encompassed hereby. In the exemplary figures, a broken line generally signifies that the feature within the broken line is optional.

The invention claimed is:

1. A method of dynamically determining a current system curve in a heat power system comprising a regulator for controlling a flow of a working medium in the heat power system, and sensors, wherein the sensors are not able to obtain a reliable point on the current system curve based on their readings, the method being performed by a controller and the method comprising:
   controlling an output of the regulator to find the current system curve;
   collecting current sensor values from the sensors;

checking if the collected sensor values are unstable, indicating that the regulator output in form of a control curve is at a position above the current system curve;

determining that the collected sensor values are unstable, indicating that a point above the current system curve has been reached;

saving the indicated point as a first point;

repeating the collecting of the current sensor values, the checking if the collected sensor values are unstable and the determining that the collected sensor values are unstable, until at least a second point of the current system curve has been indicated; and modelling the current system curve by linear interpolation between the first point and the second point of the current system curve.

2. The method according to claim 1, further comprising limiting the output of the regulator to the modelled current system curve.

3. The method according to claim 1, wherein the modelling of the current system curve is repeated each time an additional point of the current system curve has been indicated.

4. A controller for dynamically determining a current system curve in a heat power system comprising a regulator for controlling a flow of a working medium in the heat power system, and sensors, wherein the sensors are not able to obtain a reliable point on the current system curve based on their readings, the controller comprising:

a processor configured to execute instructions to cause the controller to perform operations comprising:

controlling an output of the regulator to find the current system curve;

collecting current sensor values from the sensors;

checking if the collected sensor values are unstable, indicating that the regulator output in form of a control curve is at a position above the current system curve;

determining that the collected sensor values are unstable, indicating that a point above the current system curve has been reached;

saving the indicated point as a first point;

repeating the collecting of the current sensor values, the checking if the collected sensor values are unstable and the determining that the collected sensor values are unstable, until at least a second point of the current system curve has been indicated; and modelling the current system curve by linear interpolation between the first point and the second point of the current system curve.

5. The controller according to claim 4, wherein the controller further limits the output of the regulator to the modelled current system curve.

6. The controller according to claim 4, wherein the controller further repeats the modelling of the current system curve each time an additional point of the current system curve has been indicated.

7. A non-transitory computer-readable recording medium having a computer program recorded thereon for dynamically determining a current system curve in a heat power system comprising a regulator for controlling a flow of a working medium in the heat power system, and sensors, wherein the sensors are not able to obtain a reliable point on the current system curve based on their readings, the computer program, when executed on a processor, causing the processor to perform operations comprising:

controlling an output of the regulator to find the current system curve;

collecting current sensor values from the sensors, checking if the collected sensor values are unstable, indicating that the regulator output in form of a control curve is at a position above the current system curve;

determining that the collected sensor values are unstable, indicating that a point above the current system curve has been reached;

saving the indicated point as a first point;

repeating the collecting of the current sensor values, the checking if the collected sensor values are unstable and the determining that the collected sensor values are unstable, until at least a second point of the current system curve has been indicated; and modelling the current system curve by linear interpolation between the first point and the second point of the current system curve.

\* \* \* \* \*